US006734441B2

United States Patent
Wendlandt

(10) Patent No.: US 6,734,441 B2
(45) Date of Patent: May 11, 2004

(54) COMPUTED RADIOGRAPHY CASSETTE FOR MAMMOGRAPHY

(75) Inventor: William C. Wendlandt, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 338 days.

(21) Appl. No.: 09/995,098

(22) Filed: Nov. 27, 2001

(65) Prior Publication Data

US 2003/0098423 A1 May 29, 2003

(51) Int. Cl.⁷ .................... G01J 1/58; G01N 21/64; G01T 1/00
(52) U.S. Cl. .................... 250/485.1; 250/484.4
(58) Field of Search ............ 250/485.1, 484.4, 250/582, 584, 585

(56) References Cited

U.S. PATENT DOCUMENTS

| 4,943,991 A | * | 7/1990 | Mosby | ............... 378/182 |
| 5,065,866 A | * | 11/1991 | Boutet et al. | ............... 206/455 |
| 5,276,333 A | | 1/1994 | Robertson | |
| 5,310,059 A | * | 5/1994 | Robertson | ............... 206/455 |
| 5,869,839 A | * | 2/1999 | Wendlandt et al. | ...... 250/484.4 |
| 6,191,426 B1 | * | 2/2001 | Hayakawa et al. | ...... 250/484.4 |

* cited by examiner

Primary Examiner—David Porta
Assistant Examiner—Davienne Monbleau
(74) Attorney, Agent, or Firm—William F. Noval

(57) ABSTRACT

A computed radiography cassette comprising: a shell including upper and lower panels joined to first and second side members and a front end member to form a five sided cavity having an open end; a storage phosphor assembly including a back end member, an insert plate having an upper face and being cantilevered from said back end member, and an x-ray storage phosphor disposed on said upper face of said insert plate, wherein said storage phosphor assembly is removably contained in said shell such that said back end member closes off said open end of said shell; wherein said upper panel is of x-ray transmissive material; and wherein said insert plate and said lower panel are made of x-ray opaque material having aligned sections thereof of x-ray transmissive material which allow x-rays to pass through said sections to an x-ray detector adapted to be located adjacent to said cassette.

9 Claims, 10 Drawing Sheets

COMPUTED RADIOGRAPHY CASSETTE FOR MAMMOGRAPHY

FIELD OF THE INVENTION

This invention relates in general to a cassette for use in computed radiography and more particularly to a computed radiography cassette for use in radiographic applications, such as mammography, where it is desirable to detect x-rays after their passage through the cassette for automatic x-ray exposure control and to obtain an x-ray image as close as possible to the chest wall.

BACKGROUND OF THE INVENTION

In computed radiography, a storage phosphor plate has a radiographic image formed thereon by exposing an object, such as a body part, to x-rays. The exposed storage phosphor plate is then provided to a reader where the plate is stimulated with radiation of one light frequency to emit a radiation image of another light frequency. The emitted image is captured, converted to a digital radiographic image, and stored, displayed or otherwise used.

In order to minimize damage to the storage phosphor plate during use and to prevent undesirable ambient light exposure of the plate, the storage phosphor plate is normally contained in a sturdy light tight cassette. U.S. Pat. No. 5,276,333, issued Jan. 4, 1994, inventor Robertson, discloses a cassette including a shell having upper and lower panels, first and second side members, and a front member forming a five sided cavity having an open end. A storage phosphor assembly is removably mounted in the shell and includes a back member and a rigid insert plate cantilevered from the back member. A storage phosphor is disposed on the upper surface of the insert plate. The upper panel of the shell is made of x-ray transmissive material, such as a carbon fiber composite. The lower panel is of a more x-ray opaque material such as aluminum for rigidity. The insert plate of the storage phosphor assembly is also of more x-ray opaque, material such as an aluminum honeycomb panel having an aluminum honeycomb core sandwiched between aluminum skins. The side, back and front members are of extruded aluminum and thus also more opaque to x-ray transmission.

Although the latter cassette has been commercially successful and appropriate for its applications, a need has arisen to provide a computed radiography cassette that is more x-ray transmissive in applications, such as mammography, where x-rays passing through the cassette are detected for automatic exposure control (AEC) devices which control patient exposure to x-rays. The x-ray opaque material used in the insert panel and lower panel of the described cassette inhibit transmission through the cassette of low dose x-rays. Moreover, the width of the aluminum extrusion used in the front member, along with associated clearances between the patient chest wall and internal storage phosphor screen, inhibits the use of a standard cassette in mammography where the cassette front end is positioned against the chest wall during x-ray exposure.

SUMMARY OF THE INVENTION

According to the present invention, there is provided fulfillment to the needs discussed above.

According to a feature of the present invention, there is provided a computed radiography cassette comprising:

a shell including upper and lower panels joined to first and second side members and a front end member to form a five sided cavity having an open end;

a storage phosphor assembly including a back end member, an insert plate having an upper face and being cantilevered from said back end member, and an x-ray storage phosphor disposed on said upper face of said insert plate, wherein said storage phosphor assembly is removably contained in said shell such that said back end member closes off said open end of said shell;

wherein said upper panel is of x-ray transmissive material; and wherein said insert plate and said lower panel are made of x-ray opaque material having aligned sections thereof of x-ray transmissive material which allow x-rays to pass through said sections to an x-ray detector adapted to be located adjacent to said cassette.

ADVANTAGEOUS EFFECT OF THE INVENTION

The invention has the following advantages.

1. A computed radiography cassette is provided that can be used in applications, such as mammography, using automatic x-ray exposure control to reduce patient exposure to x-rays.

2. A computed radiography cassette is provided that can be used to capture x-ray images close to the chest wall in mammography applications.

3. A modified computed radiography cassette is provided that can be used in existing CR readers with little or no modification to the readers.

BRIEF DESCRIPTION OF THE DRAWINGS

FIG. 8a is an exploded view of a portion of the assembly of FIG. 8.

FIGS. 9–11 are diagrammatic views useful in explaining the present invention.

DETAILED DESCRIPTION OF THE INVENTION

In general, the present invention relates to a computed radiography cassette for use in radiographic applications, such as, mammography, where the entire cassette must have relatively high x-ray transmissivity at relatively low x-ray exposure levels. The transmitted x-rays are detected by an automatic exposure control device to reduce patient exposure to x-rays. The cassette also allows x-ray exposure much closer to the chest wall than a conventional cassette.

Figure 1:
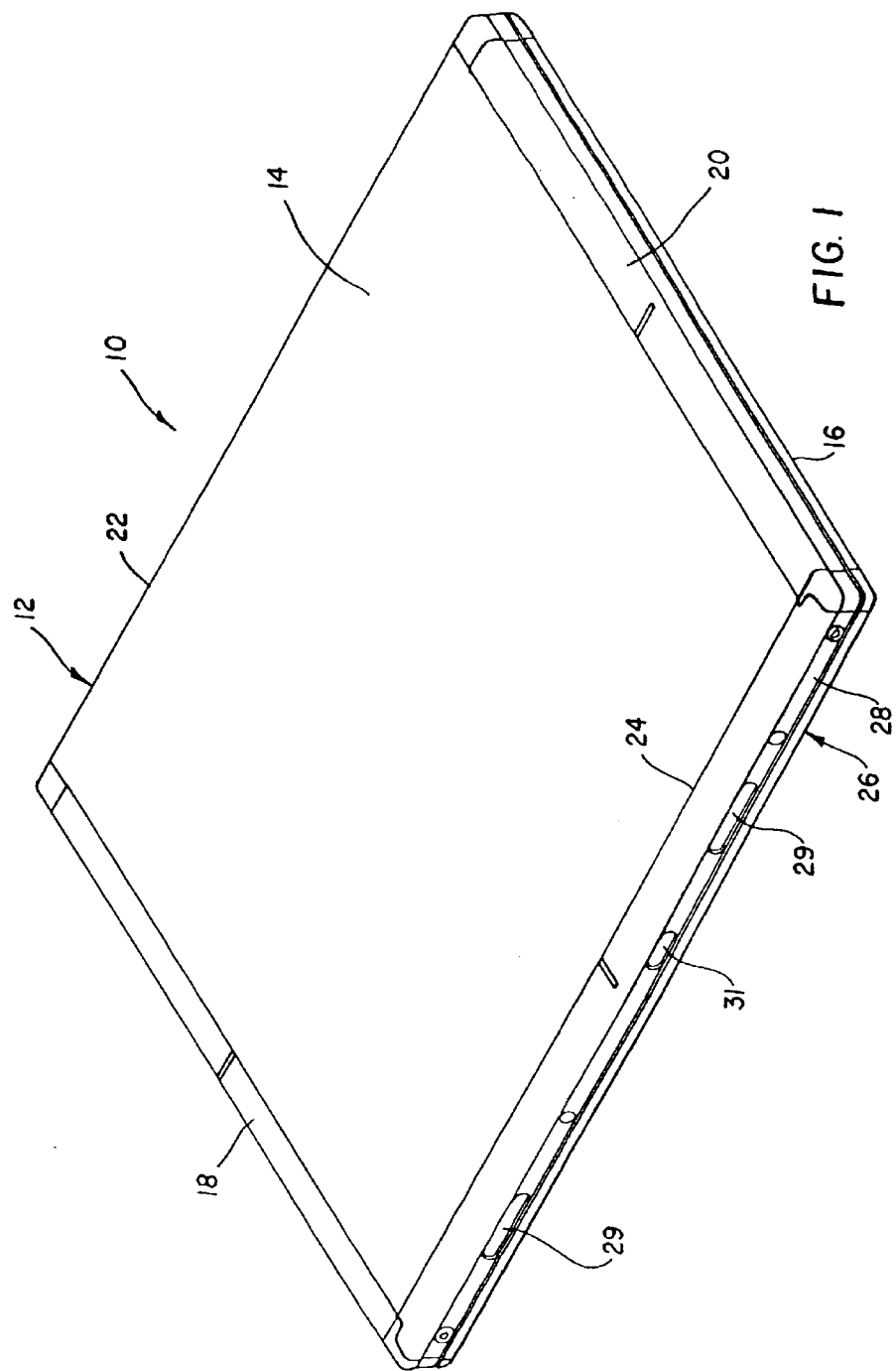
FIG. 1 is a top perspective view of a computed radiography cassette according to the present invention.
Figure 2:
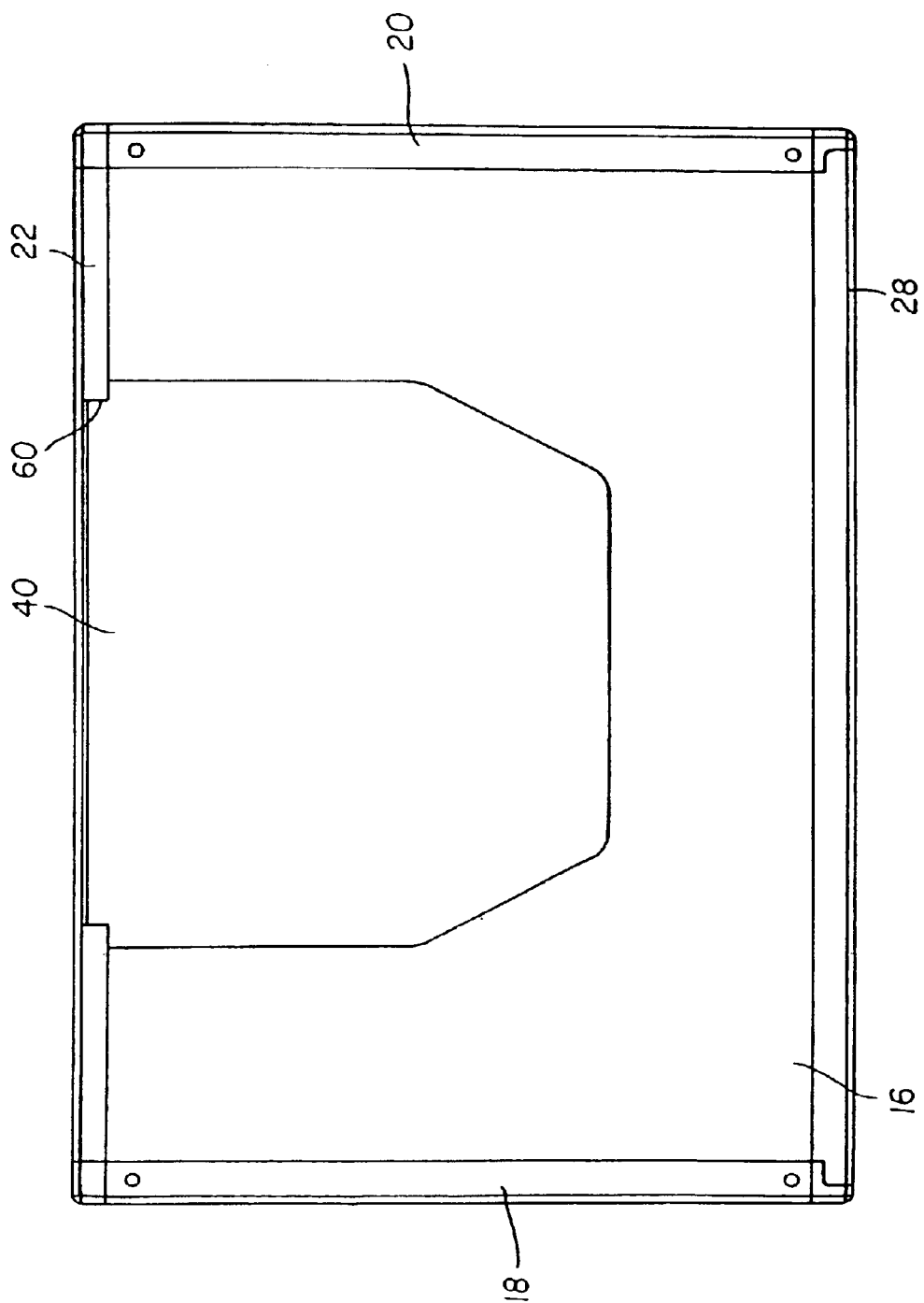
FIGS. 2 and 3 are plan views of components of one embodiment of the cassette of FIG. 1.
Figure 3:
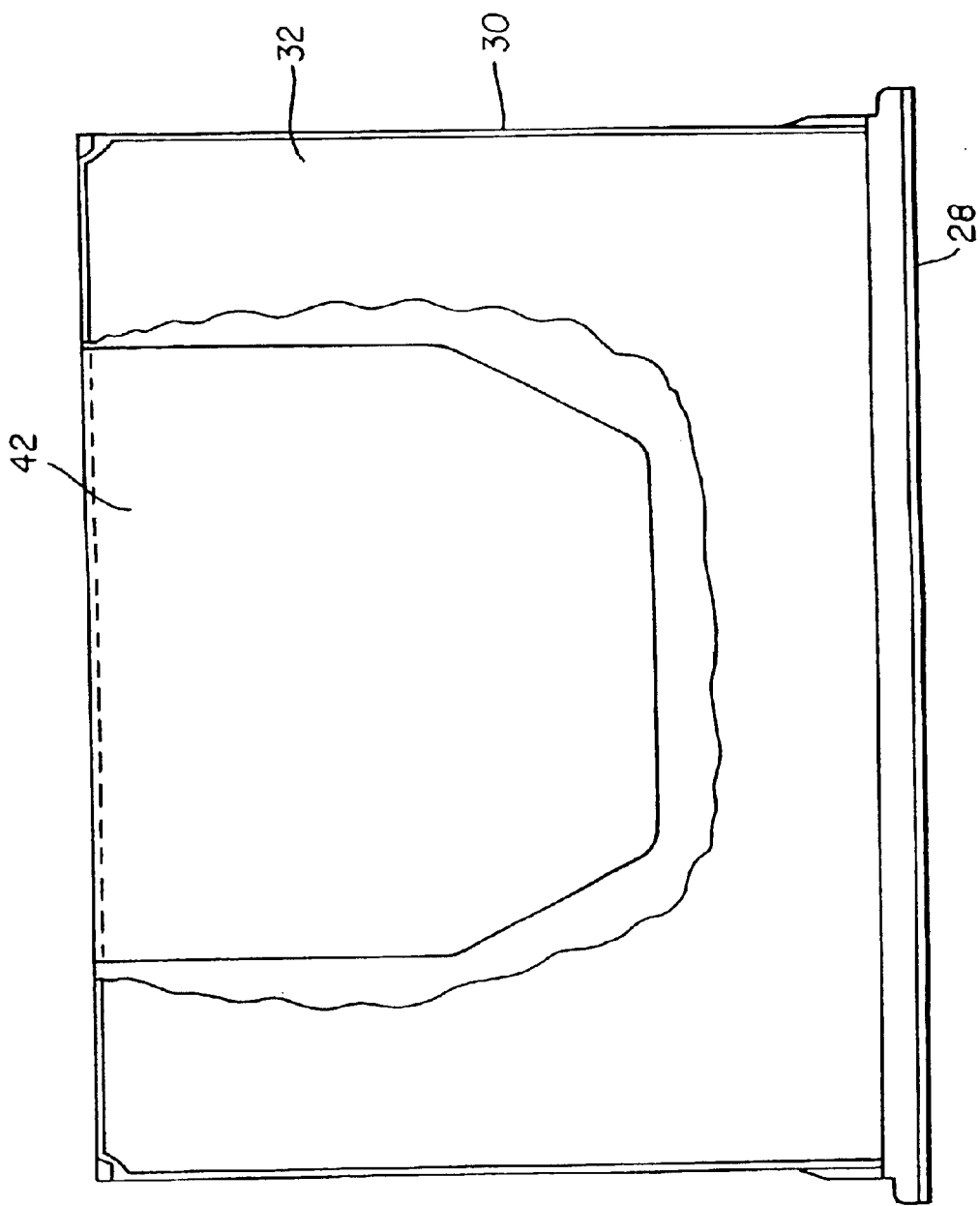

Referring now to FIGS. 1–3 there is shown one embodiment of computed radiography (CR) cassette according to the present invention. As shown, computed radiography cassette 10 includes a shell 12 including upper and lower panels 14 and 16, first and second side members 18 and 20, and a front end member 22, which form a five sided cavity having an open end 24. Cassette 10 also includes a storage phosphor assembly 26 including a back member 28, an insert plate 30 cantilevered from back end member 28 (FIG.

3), and an x-ray storage phosphor 32 disposed on the upper surface of plate 30. Member 28 includes apertures 29, 31 for access to the interior of member 28 to latch and unlatch a latch bar (not shown) slidably mounted therein. (U.S. Pat. No. 5,276,333, issued Jan. 4, 1994, inventor Robertson, discloses details of a suitable latching/unlatching mechanism which can be used herein).

Storage phosphor assembly 26 is removably contained in shell 12 such that back end member 28 closes off the open end 24 of shell 12 providing a light tight enclosure for storage phosphor 32.

According to the embodiment of the invention shown in FIGS. 1–3, there is provided a computed radiography cassette that is more transmissive to x-rays and that can capture an x-ray image closer to the chest wall than a standard CR cassette. These improvements are achieved by the following modifications to a standard CR cassette.

1. Side, back end and front end members 18, 20, 28 and 22 respectively are made of extruded aluminum with opposed edges that extend inwardly a given distance (e.g., 11 mm) to support upper and lower panels 14 and 16. According to a feature of the invention, the upper portion of front end 22 is removed to allow extension of upper panel 14 (which is of x-ray transmissive material such as, carbon fiber composite) to the end of cassette 10. Thus, when cassette 10 is positioned so that the front end 22 abuts against the chest wall of a patient, a radiation image of the breast next to the chest wall can be captured.

2. Lower panel 16 and insert plate 30 are respectively provided with aligned, complementary sections 40, 42 of x-ray transmissive material such as polymeric material. The remaining section of lower panel 16 is of aluminum or other more x-ray opaque material for rigidity. The remaining section of insert plate 30 is also of more x-ray opaque material, such as an aluminum honeycomb panel (FIG. 11) having an aluminum honeycomb core 50, sandwiched between aluminum skins 52, 54. The greater x-ray transmissitivity of sections 40, 42 result in greater x-ray transmissitivity of cassette 10 as a unit. This facilitates the use of cassette 10 in mammography (or other applications) where an automatic x-ray exposure device can be positioned below cassette 10 in the region of sections 40, 42 to detect the lower x-ray exposure used in mammography.

Figure 10:
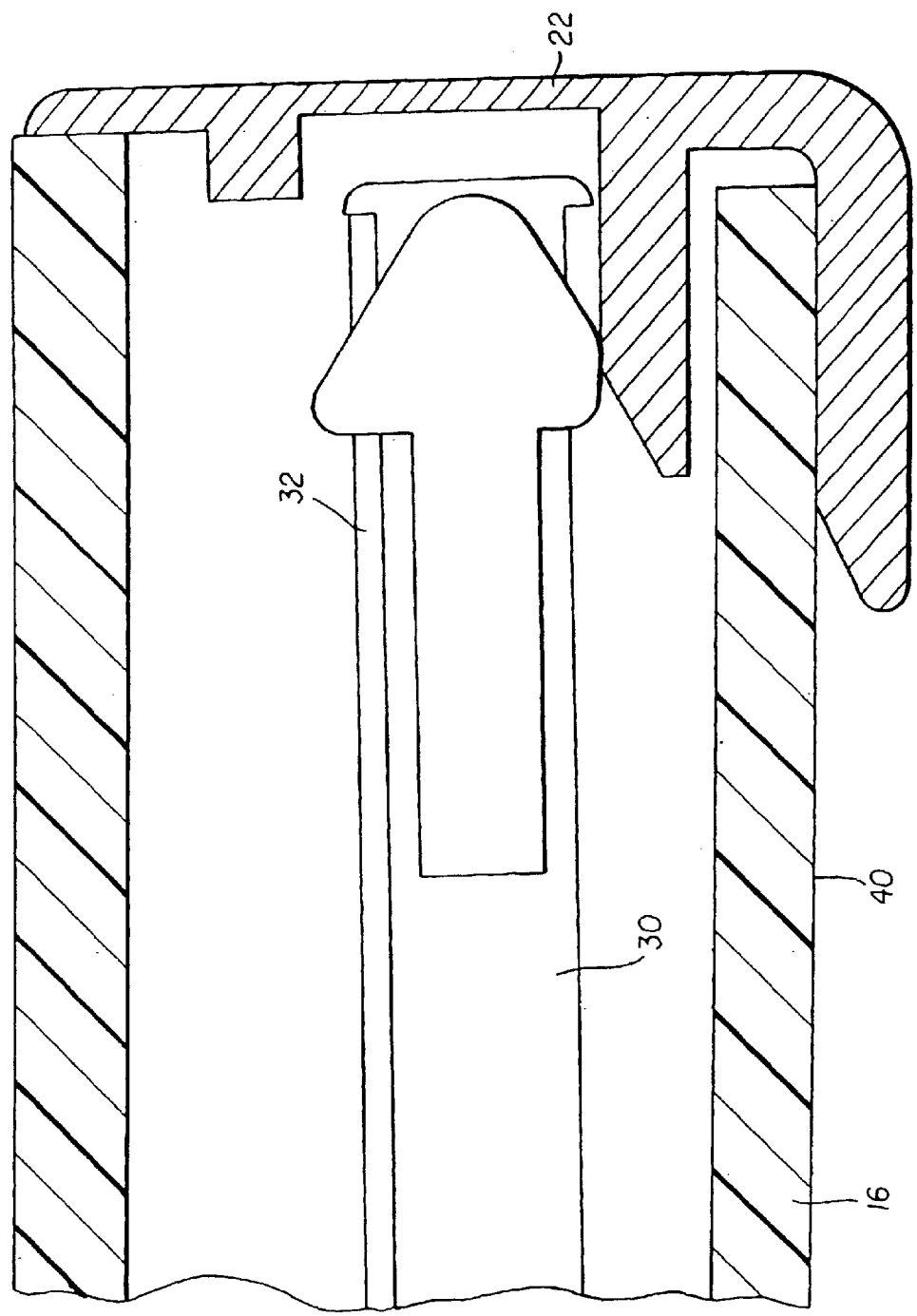

3. The insert plate 30 is extended to end closer to the end of front end 22 so that storage phosphor 32 can be extended to capture the radiographic image of the breast closer to the chest wall. This is shown in FIG. 10, which shows plate 30 and storage phosphor 32 extending further into the front end 22 than is the case with a conventional cassette. The improved design can position the screen 0–3 mm from the patient chest wall, whereas the current CR cassette maintains a distance of approximately 11 mm.

4. The bottom edge of front end 22 is cut out at 60 (FIG. 2) to increase the x-ray transmissivity of the cassette 10 the near front end thereof which would engage a patient's chest wall.

Figure 8:
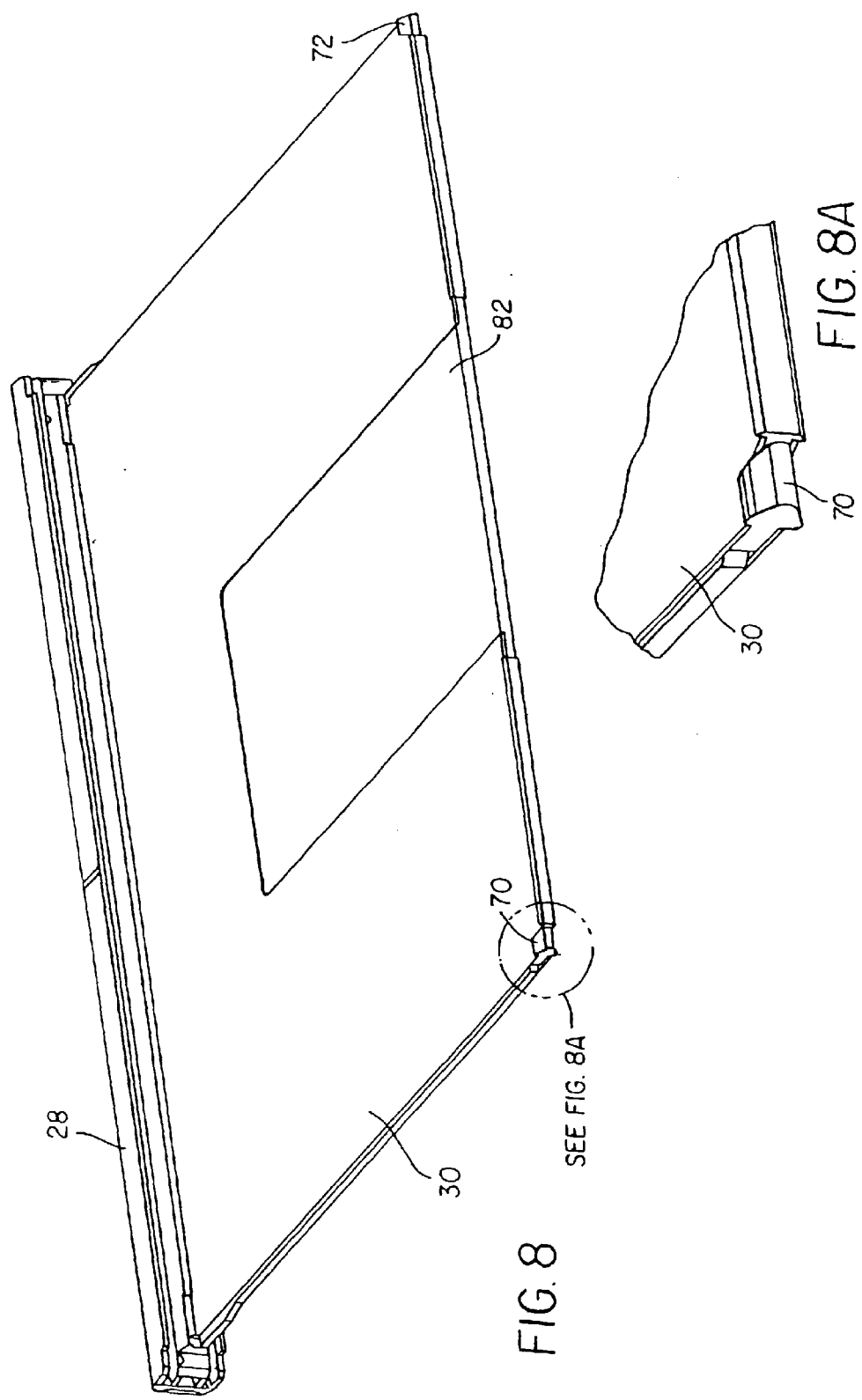
FIG. 8 is a perspective view of a storage phosphor assembly.
Figure 9:
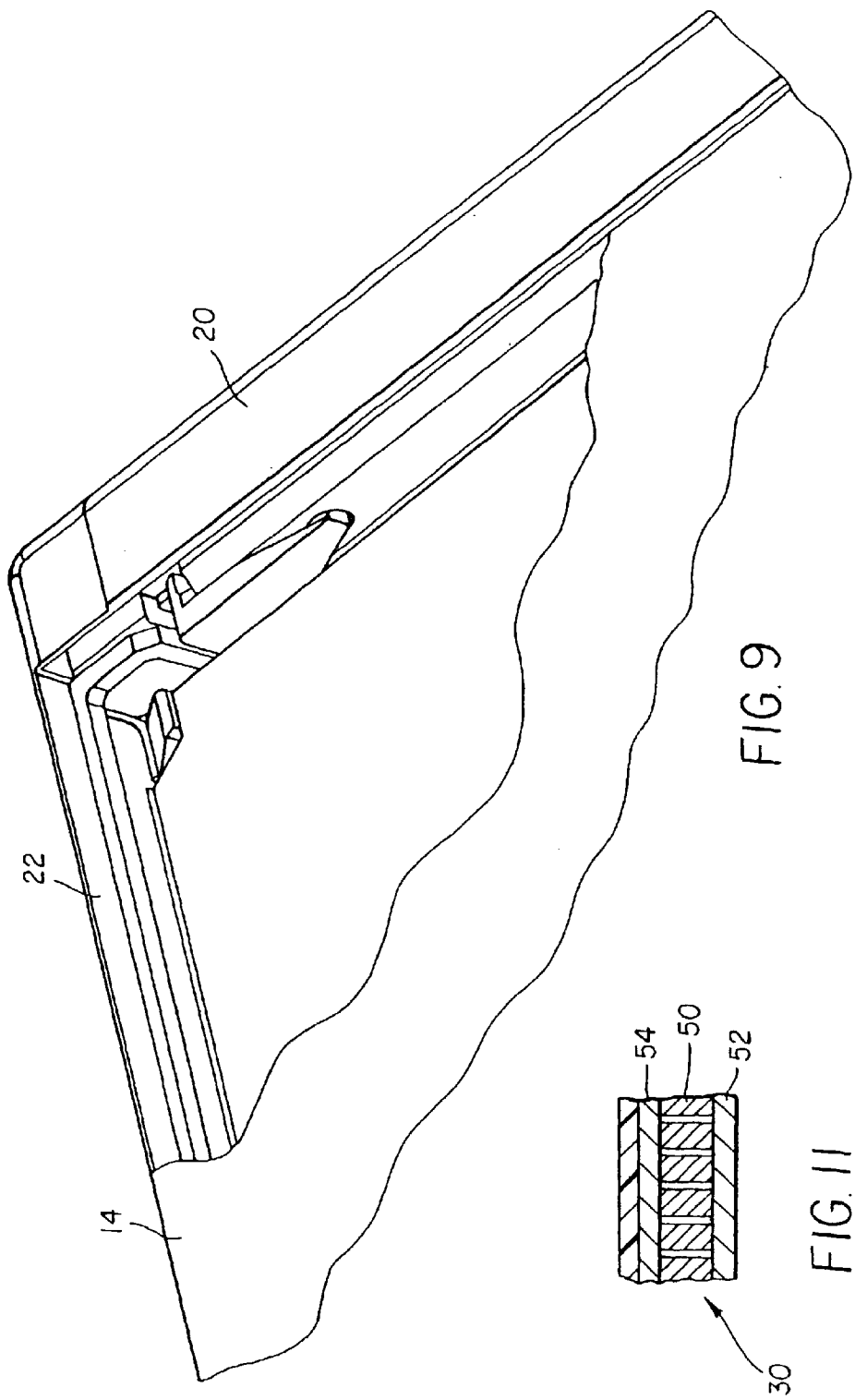

5. Nose inserts 70, 72 (FIGS. 8, 8a, 9) are positioned on the sides of insert plate 30 to facilitate insertion and removal of storage phosphor assembly relative to cassette 10. In the conventional cassette, an elongated nose insert is located on the front edge of plate 30. By repositioning the nose insert, and keeping it from protruding past the extreme front edge of insert plate 30, room was made to extend the storage phosphor, and minimize the screen distance from the patient chest wall.

Figure 4:
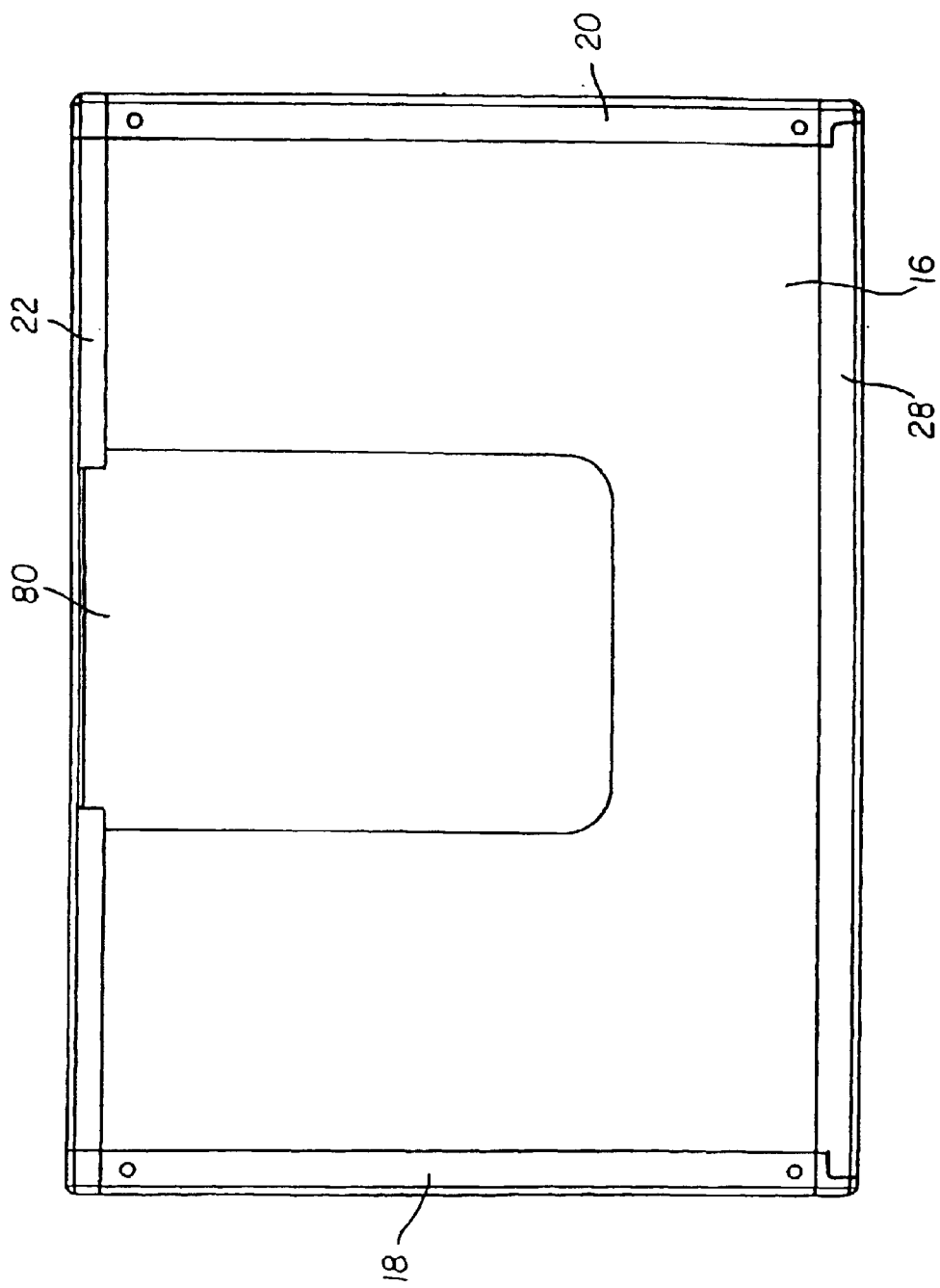
FIGS. 4 and 5 are plan views of components of another embodiment of the cassette of FIG. 1.
Figure 5:
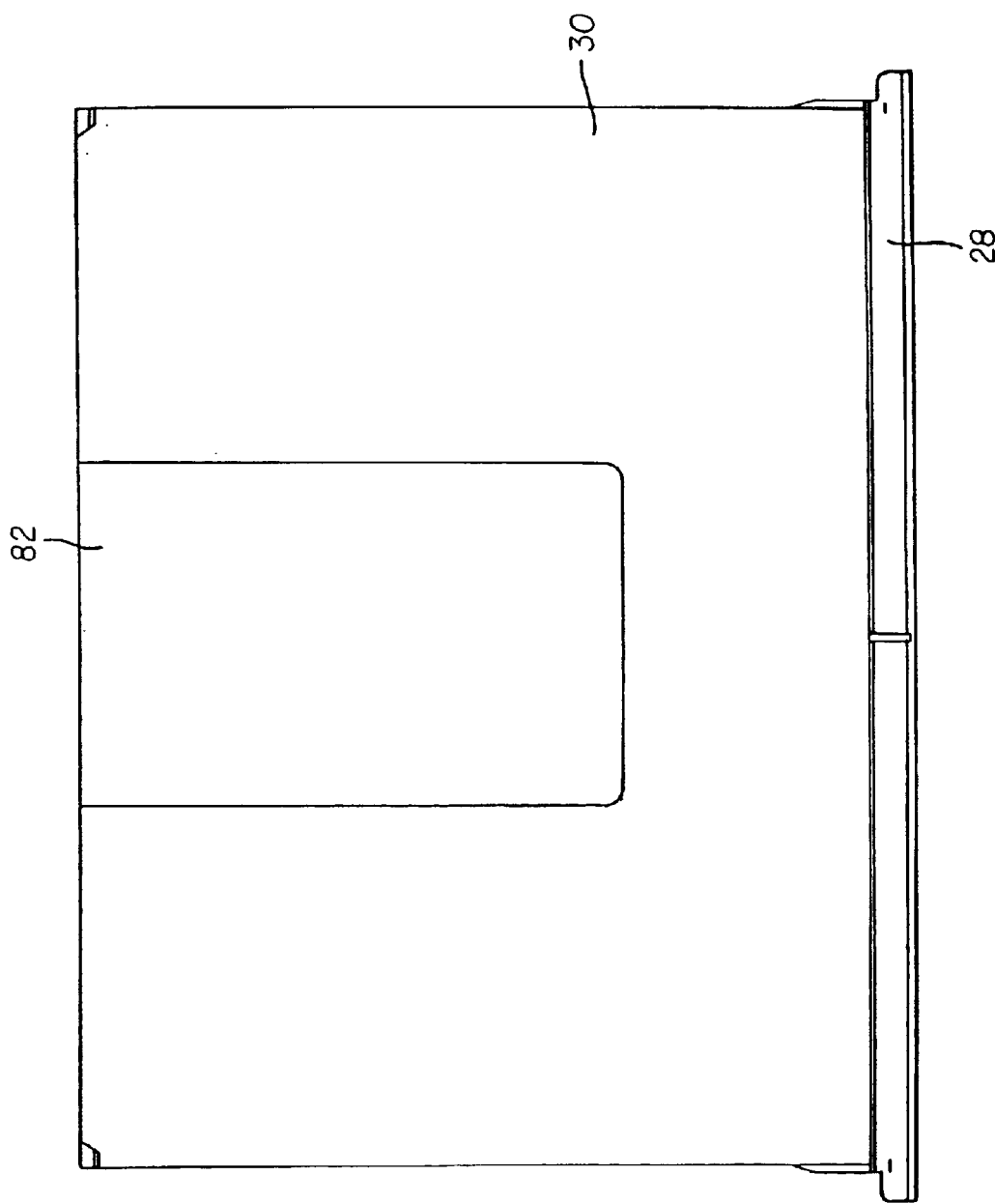
Figure 6:
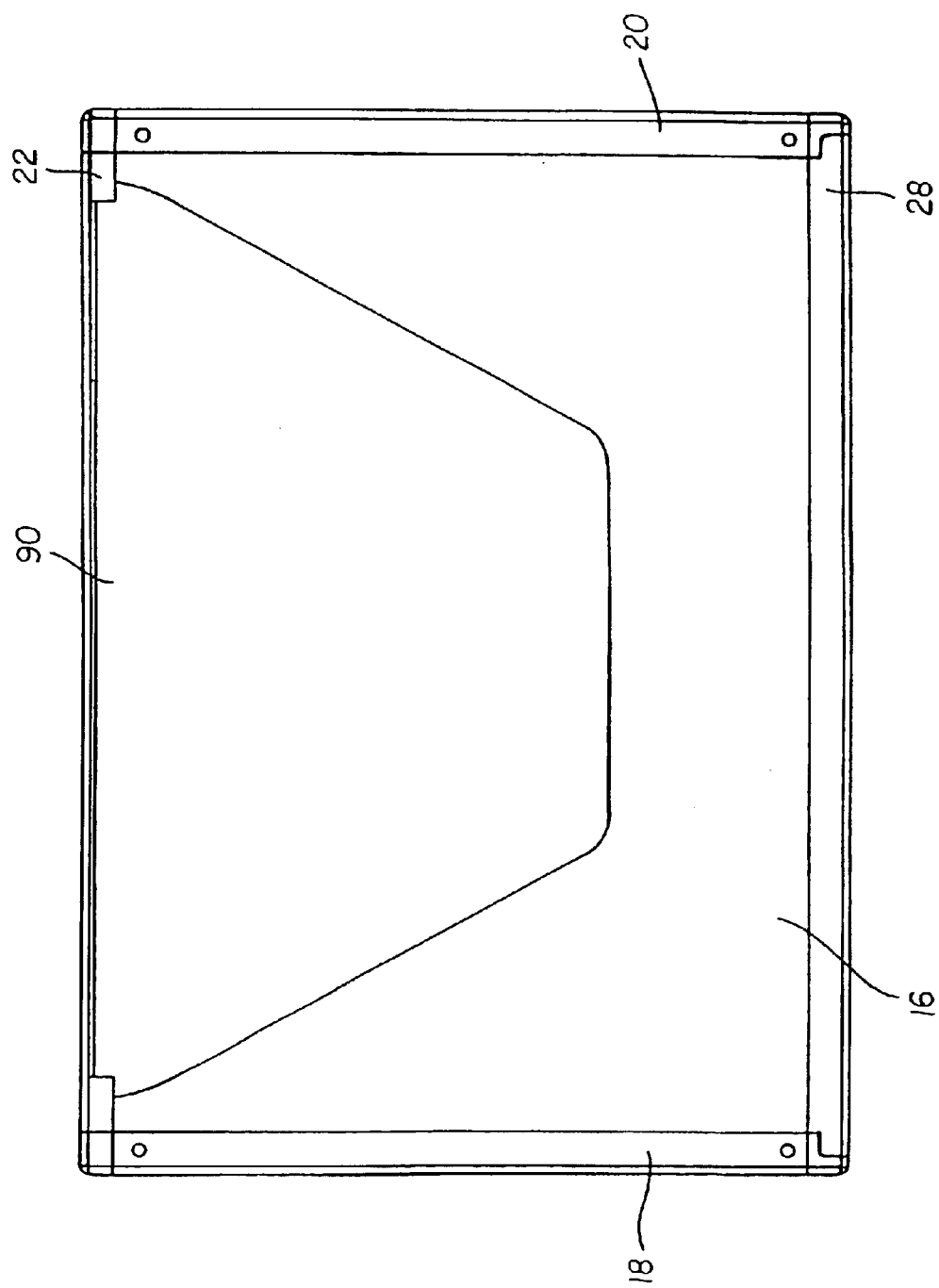
FIGS. 6 and 7 are plan views of components of a further embodiment of the cassette of FIG. 1.
Figure 7:
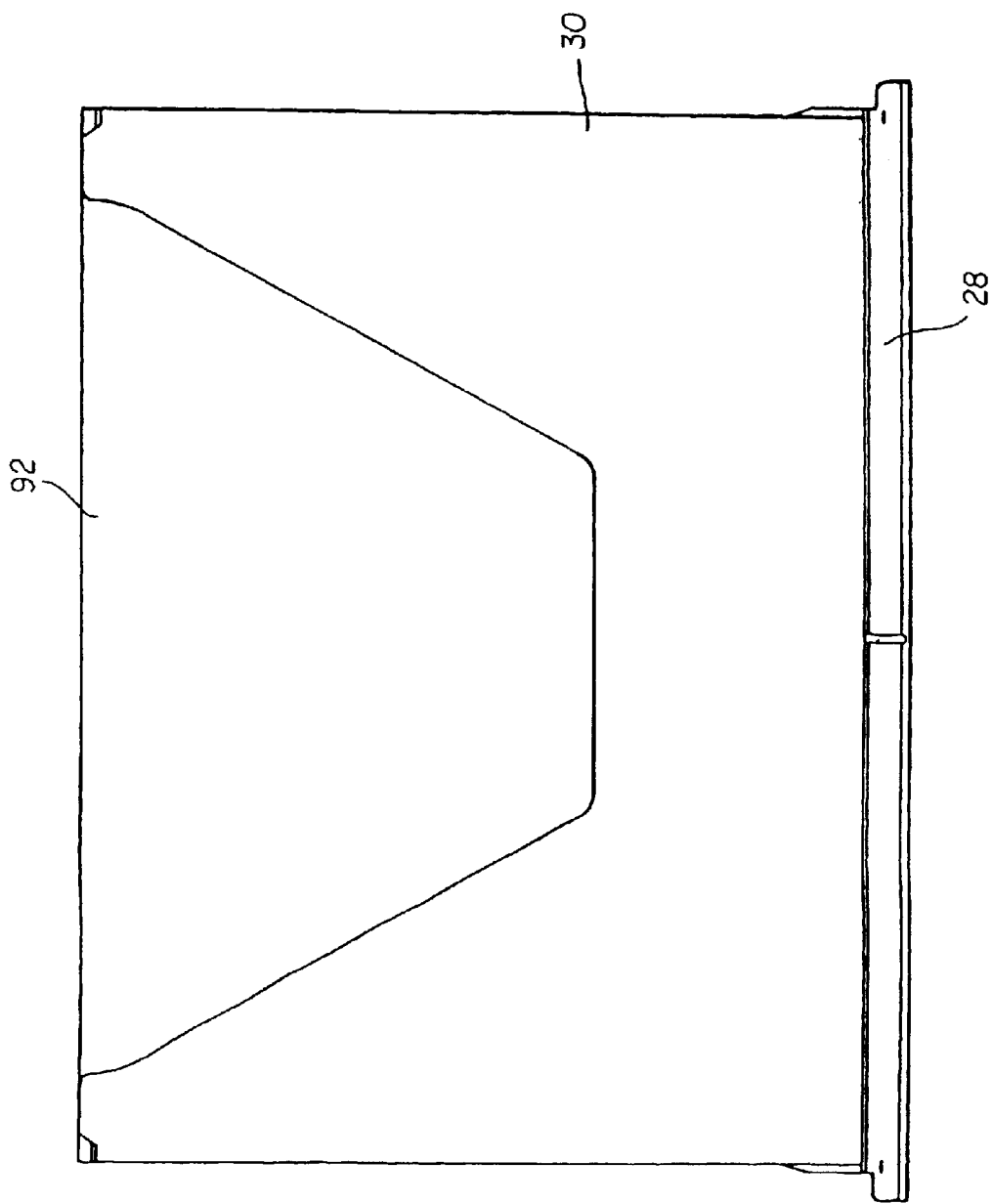

The x-ray transmissive sections 40, 42 shown in FIGS. 2 and 3 are illustrative only and are shown as having six sides. In the embodiment shown in FIGS. 4 and 5, rectangular sections 80 and 82 are of x-ray transmissive material and are respectively, mounted on lower panel 16 and insert plate 30. In the embodiment shown in FIGS. 6 and 7, truncated pyramidal sections 90, 92 of x-ray transmissive material are respectively mounted on lower panel 16 and insert plate 30. It will be understood that other configurations of x-ray transmissive sections may be used, as well as multiple sections, depending upon the x-ray equipment used.

Other modifications to the cassette size may be desirable to facilitate use in mammography applications. Such cassette size changes may require modifications to existing CR readers. Alternatively, a larger size cassette adapter could be used to accomplish interface to the CR readers without mechanical reader modification. These cassette size modifications could be incorporated with all above mentioned new features, such that the cassette could be used with standard mammographic exam equipment (bucky holders etc.), requiring no modifications.

The invention has been described in detail with particular reference to certain preferred embodiments thereof, but it will be understood that variations and modifications can be effected within the spirit and scope of the invention.

Parts List 10 cassette
12 shell
14 upper panel
16 lower panel
18 first side member
20 second side member
22 front end member
24 open end
26 storage phosphor assembly
28 back end member
29 aperture
30 insert plate
31 aperture
32 storage phosphor
40,42 complementary section
50 honeycomb core
52,54 aluminum skins
60 increases the x-ray transmissitivity
70,72 nose inserts
80,82 triangular sections x-ray transmissive material
90,92 truncated pyramidal sections x-ray transmissive material

What is claimed is:

1. A computed radiography cassette comprising:
   a shell including upper and lower panels joined to first and second side members and a front end member to form a five sided cavity having an open end;
   a storage phosphor assembly including a back end member, an insert plate having an upper face and being cantilevered from said back end member, and an x-ray storage phosphor disposed on said upper face of said insert plate, wherein said storage phosphor assembly is removably contained in said shell such that said back end member closes off said open end of said shell;
   wherein said upper panel is of x-ray transmissive material; and
   wherein said insert plate and said lower panel are made of x-ray opaque material having aligned sections thereof of x-ray transmissive material which allow x-rays to pass through said sections to an x-ray detector adapted to be located adjacent to said cassette.

2. The cassette of claim 1 wherein said insert plate is a lightweight rigid structure including an aluminum honeycomb core and outer aluminum skins having a section of x-ray transmissive material.

3. The cassette of claim 1 wherein said lower panel is of aluminum having a section of x-ray transmissive material.

4. The cassette of claim 1 wherein said sections respectively of said insert plate and said panel include multiple aligned subsections.

5. The cassette of claim 1 wherein said first and second side members and said front end member are of x-ray opaque material and of a channel cross-section having respective upper and lower edges, wherein said upper edge of said front end member is removed and said storage phosphor is extended into said front end member to capture radiation of a projecting body part of a patient close to the body of said patient.

6. The cassette of claim 5 wherein said lower edge of said front end member is removed.

7. The cassette of claim 1 including nose inserts located at the front corners of said insert plate to facilitate insertion and removal of said storage phosphor assembly relative to said cassette shell.

8. The cassette of claim 5 wherein said storage phosphor extends within 3 mm of the front surface of said front end member.

9. The cassette of claim 5 wherein the outer dimensions of said cassette conform to mammography cassette standards so that the cassette can be used in existing mammography radiation equipment without modification.

* * * * *